(12) United States Patent
Clark et al.

(10) Patent No.: US 9,282,100 B2
(45) Date of Patent: Mar. 8, 2016

(54) PRIVILEGE SEPARATION

(71) Applicant: Cisco Technology, Inc., San Jose, CA (US)

(72) Inventors: Jonathan Clark, Knoxville, TN (US); Tyler Abair, New Milford, CT (US)

(73) Assignee: Cisco Technology, Inc., San Jose, CA (US)

( * ) Notice: Subject to any disclaimer, the term of this patent is extended or adjusted under 35 U.S.C. 154(b) by 21 days.

(21) Appl. No.: 14/093,904

(22) Filed: Dec. 2, 2013

(65) Prior Publication Data

US 2015/0156202 A1 Jun. 4, 2015

(51) Int. Cl.
*H04L 29/06* (2006.01)
*G06F 21/60* (2013.01)

(52) U.S. Cl.
CPC ............... *H04L 63/10* (2013.01); *G06F 21/60* (2013.01)

(58) Field of Classification Search
CPC ....................................................... H04L 63/10
USPC .................................. 726/4, 5–6, 18–19, 27
See application file for complete search history.

(56) References Cited

U.S. PATENT DOCUMENTS

| | | | |
|---|---|---|---|
| 7,043,553 B2 | 5/2006 | Monsen et al. | |
| 7,594,267 B2* | 9/2009 | Gladstone | G06F 21/55 725/25 |
| 7,739,298 B1* | 6/2010 | Crim et al. | 707/781 |
| 8,051,491 B1* | 11/2011 | Cavage | G06F 21/6218 707/609 |
| 8,230,484 B1* | 7/2012 | Wiese | H04W 4/08 726/27 |
| 8,239,936 B2* | 8/2012 | Schneider | 726/17 |
| 8,453,252 B2* | 5/2013 | Shah | G06F 8/34 726/2 |
| 8,516,508 B1 | 8/2013 | Tran | |
| 8,826,419 B2* | 9/2014 | Austin | G06F 21/6218 726/20 |
| 2005/0071641 A1* | 3/2005 | Basibes et al. | 713/182 |
| 2006/0101522 A1* | 5/2006 | Rothwell et al. | 726/26 |
| 2006/0143350 A1* | 6/2006 | Miloushev et al. | 710/242 |
| 2007/0113291 A1* | 5/2007 | Dai et al. | 726/27 |
| 2010/0131512 A1* | 5/2010 | Ben-Natan et al. | 707/741 |
| 2010/0262977 A1* | 10/2010 | Havemose | 719/310 |
| 2012/0291138 A1* | 11/2012 | Haga et al. | 726/27 |
| 2013/0024929 A1* | 1/2013 | Abraham | G06F 21/53 726/16 |
| 2013/0268799 A1 | 10/2013 | Mestery et al. | |

* cited by examiner

*Primary Examiner* — Hadi Armouche
*Assistant Examiner* — Ali Shayanfar
(74) *Attorney, Agent, or Firm* — Lempia Summerfield Katz LLC (57) ABSTRACT

In one implementation, an interposer library is installed on an embedded system or another type of computing system. The system may be configured to host web services or route data packets. A processor, executes processes of the system, and the interposer library intercepts data indicative of relationships of the processes. An access map is generated based on relationships of the processes of the system. The system is modified according to a set of procedures derived from the access map. The set of procedures may be derived by the processor or the access map. The set of procedures may be a minimum privilege solution that minimizes the privilege level of each process to a lowest privilege possible while maintaining the requisite functions of the process.

17 Claims, 6 Drawing Sheets

PRIVILEGE SEPARATION

TECHNICAL FIELD

This disclosure relates in general to the field of privilege separation, or more specifically, to the addition of privilege separation into a system and/or gathering runtime code flow information for use in privilege separation.

BACKGROUND

The portal operating system interface (POSIX) is a set of standards maintained by the Institute of Electrical and Electronics Engineers (IEEE) for specifying compatibility between operating systems. The set of standards may define various features, such as command line shells, utilities, and application programming interfaces.

POSIX may also specify privileges. A POSIX-based system may include a framework for allowing certain running code access to certain resources through the use of users and groups. Users and groups can be granted ownership and/or permissions to access any files on the system, as well as permissions for a number of other activities. However, because the assignment of privileges is optional, privileges are often omitted.

A common problem with POSIX-based systems is that running code on the system is given full access to everything through the root user. Consequently, if an attacker were to exploit a security vulnerability on the system, the attacker would gain complete access through the root user to the entire system, which could be avoided if permissions were properly restricted.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, an interposer library is installed on a computing system. Processes of the system are executed, and the interposer library intercepts data indicative of relationships of the processes. An access map is generated based on the relationships of the processes of the computing system and stored in memory. The computing system modifies privileges of the processes of the system according to a set of procedures derived from the access map.

Example Embodiments

Most operating systems define a user account for system administration. The administrator account may be also referred to as a superuser, root, or admin. The root account has rights and permission to all files and programs in all modes. The design of POSIX-based computer systems may include a framework for allowing specific running code or sets of instructions access to certain resources through user accounts and groups of user accounts. While it is recommended to design most applications to operate using an ordinary account (not the root account) that does not have the rights to make system wide changes, in practice, many developers prefer to take shortcuts. Designs are easier if all running code on the system is given access to everything through the root account. However, this shortcut opens vulnerabilities. Any unauthorized access to the system may easily achieve the root level of access, which exposes all aspects of the system.

The following embodiments introduce privilege separation into an existing system. The system may have many processes with up to thousands of permissions or more each. The system is profiled to examine every process on the system to determine what resources each process should be allowed to access. Profiling is done automatically, through monitoring the system as the system operates. There is no need to review documentation or code to understand the needs of each process.

A set of privileges is derived from the associations between individual processes and resources. The set of privileges may define a new privilege for each process. The set of privileges may be implemented on the system automatically or through a user interface that allows a system designer to assign the new privileges to processes, delete privileges or processes, and/or insert a different number of privileges.

Figure 1:
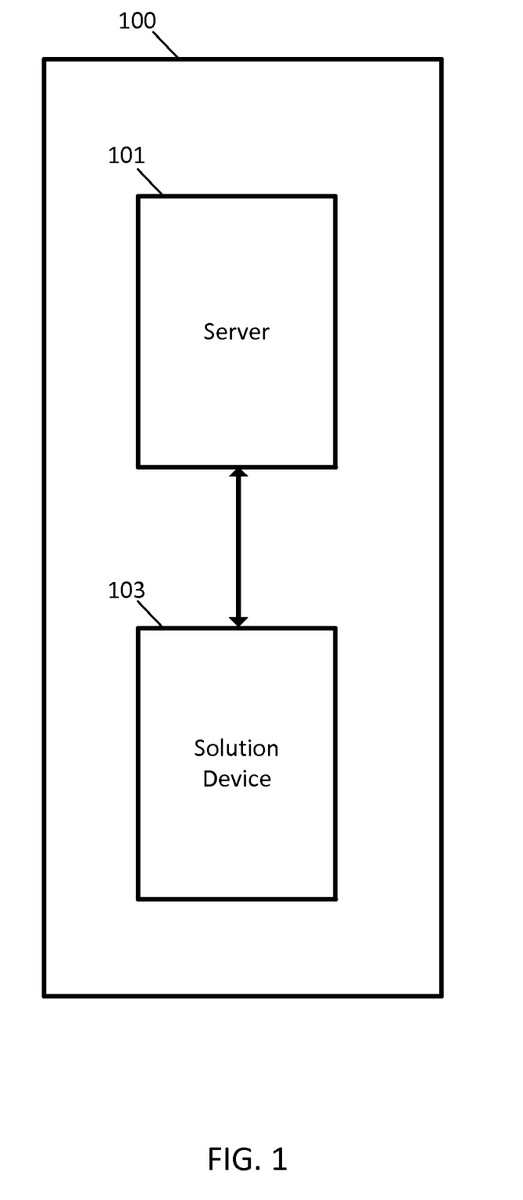
FIG. 1 illustrates a system for optimizing privileges in a server.

FIG. 1 illustrates a system 100 for optimizing privileges in a server 101. The system 100 also includes a solution device 103. Additional, different, or fewer components may be included. The server 101 may be a web server, a router, a gateway, or another network device. The server 101 may include an embedded system with hardware and instructions dedicated for a specific function. The operating system of the server 101 may be any operating system in which library function calls may be intercepted. These operating systems include any POSIX-based operating system. Examples include, but are not limited to, Unix, Linux, or another application running over Unix or Linux.

The solution device 103 may initiate an algorithm for privilege separation in the server 101. In one example, the solution device 103 installs instructions for privilege separation and initiates execution of the instructions by the server 101. In another example, the solution device 103 obtains access to the server 101 and the solution device 103 executes the instructions. In yet another example, the server 101 executes instructions for the algorithm so the server 101 itself the solution device 103.

First, an interposer library is installed on the server 101. A library is a collection of code or implementation of functions that may be used one or more times by different processes. The interposer library is configured to insert itself in front of other libraries. The interposer library gathers information about the operation of the server 101. When a process of the server 101 attempts to call a function in a library, all of the libraries linked to the function are searched in a predefined order, as described by the operating system or other application running on the server 101.

When the linked libraries are searched, the first located instance of the function may be invoked from the first library in the predefined order. The interposer library inserts itself as an alternative library, which is not otherwise linked by the process, to be searched before any other library. Therefore, when a library function call is attempted by the process, the interposer library is checked first. If a version of the function call exists in the interposer library, the version of the function call in the interposer library is invoked first instead of or just before any version in any other library.

The interposer library is dynamic. The interposer library may be inserted in any chain of libraries of the operating system or other programs of the server 101. In one example, the interposer library is copied to the server 101, and a configuration file is generated to control the interposer library. The configuration file includes a list of processes for the interposer library to target. The configuration file may also include a file path to log the results in a log file. The configuration file may also include a number of other options that specify how data is logged. One option may specify whether file access is logged. The file access portion of the log may include timestamps, filenames, and file paths for files accessed by processes. One option may specify whether children processes of a listed process should also be logged. In one alternative, the configuration file includes a list of process for the interposer library not to target. In other words, the interposer library defaults to targeting all processes unless included in the configuration file.

The user may determine that the library has been installed in place and instructs the server 101 to run in a manner that allows the interposer library to gather information from the processes. Alternatively, the server 101 may be configured to detect when the interposer has been installed. For example, the interposer library may generate a ready message when the configuration file has been read and the interposer library is ready to begin intercepting and executing processes. The server 101 may run processes in response to the ready message and according to a variety of techniques. In one example, the server 101 follows a predetermined list of processes derived from the source code of the programs on the server 101. In another example, the interposer library may detect all of the processes using regression testing. A regression test is configured to execute all of the code on the system. The regression test may be a test used to test software before any release of the software.

Next, the processes of the server 101 are executed in order to gather information about the processes. The interposer library may follow a list of function names. The list may also include information about the function definition, such as the return type and input parameters of each function. The list may be user provided.

The user may also provide a generalized type of permissions error that each function may cause. For example, a function may get a file access error if the function is configured to access a file, and a function may get a process access error if the function is configured to access another process. The interposer library is configured to execute code to capture calls of the functions and collect a configurable set of data about the function. The configurable set of data may be a list of functions organized by title and properties of the function. The properties may include file paths that the function may attempt to access, error messages received, or other data collected from executing the function.

As each of the processes execute, the interposer library detects calls to the functions which were included in the function list. As the interposer library detects each call, the interposer library logs information about the call. The data logged by the interposer library includes data that describes a description of the call, where the call was made from, and which resources were used by the call. This information may be written in a documented plain text or other format to the log file. When the test runs are completed, the log file may be copied from the server 101 back to another device (e.g., solution device 103) for development, testing or further analysis.

The interposer library also passes the call along to the originally intended implementation in another library. The information gathering by the interposer library may not be detectable by the processes. The code to perform information gathering by the interposer library is generated automatically when the interposer library is compiled. In addition, many of the most commonly used functions may be added to the interposer library by default, allowing most users to simply compile and use the existing library.

The solution device 103 or the server 101 generates an access map based on relationships of the processes executed by the server 101 with resources such as files, memory, and other processes. Relationships of the processes of the server 101 may be derived from the list of functions gathered by the interposer library. The access map is stored at the server 101 and/or the solution device 103.

The server 101 is modified according to a set of procedures derived from the access map. Privileges are assigned to processes according to the access map. The access map may be used to or may itself describe a usable least privilege solution. The least privilege solution, which may be referred to as the minimal privilege solution or the least authority solution, gives rights and permission at the lowest level possible for the processes to still accomplish the intended functionality of the processes.

The least privilege solution is a suggested configuration for the server 101. The configuration includes a list of users and groups to be created and specification to assign ownership and permissions of resources. The information received by the solution device 103 may be in the form "process X accesses resource A in this way," and the output of the solution device 103 is of the form "assign process X to user 1, assign user 1 to groups I and II, and assign resource A ownership to user 1." In effect, the solution device 103 receives non-actionable information about the server 101 and generates an actionable solution to be applied to the server 101. The functions of the solution device 103, for example generating the least privileged solution, may be performed internally by the server 101.

The least privilege solution may be limited to rules. One example rule may specify that each process is assigned to be run as a different, newly created user. Processes running as different users cannot directly affect each other, and so this rule ensures process isolation. However, there are cases in which processes are allowed direct interaction via signals. The signals are a standard set of messages defined by the operating system that may be sent to any running process on the system. The signals may be sent by a user from a command line, or by one process to another. When received, the signals may interrupt the normal execution flow of a process. The signals are handled by the process, or a default handler provided by the operating system, and then execution may continue depending on the signal. Some fairly common signals include to terminate the target process and to pause or resume the target.

Processes that are not owned by the same user may not send signals between each other unless the sender is root. In these cases, processes may be grouped under a single user. The solution device 103 may be configured to detect the need for direct interaction and group the related processes accordingly as a single user.

One example rule may specify the use of groups to grant file access. Files may require access by a single process, and therefore a single user, or by multiple processes and users.

When just a single user requires access to a file, the user may be granted ownership of the file. However, in order to provide file access across different users without breaking the process isolation described previously, POSIX-standard groups may be used. A group may be assigned ownership of a given file. Multiple users who require file access may be added to the group. In this way, multiple processes access the same file without breaking any least privilege constraints.

Figure 2:
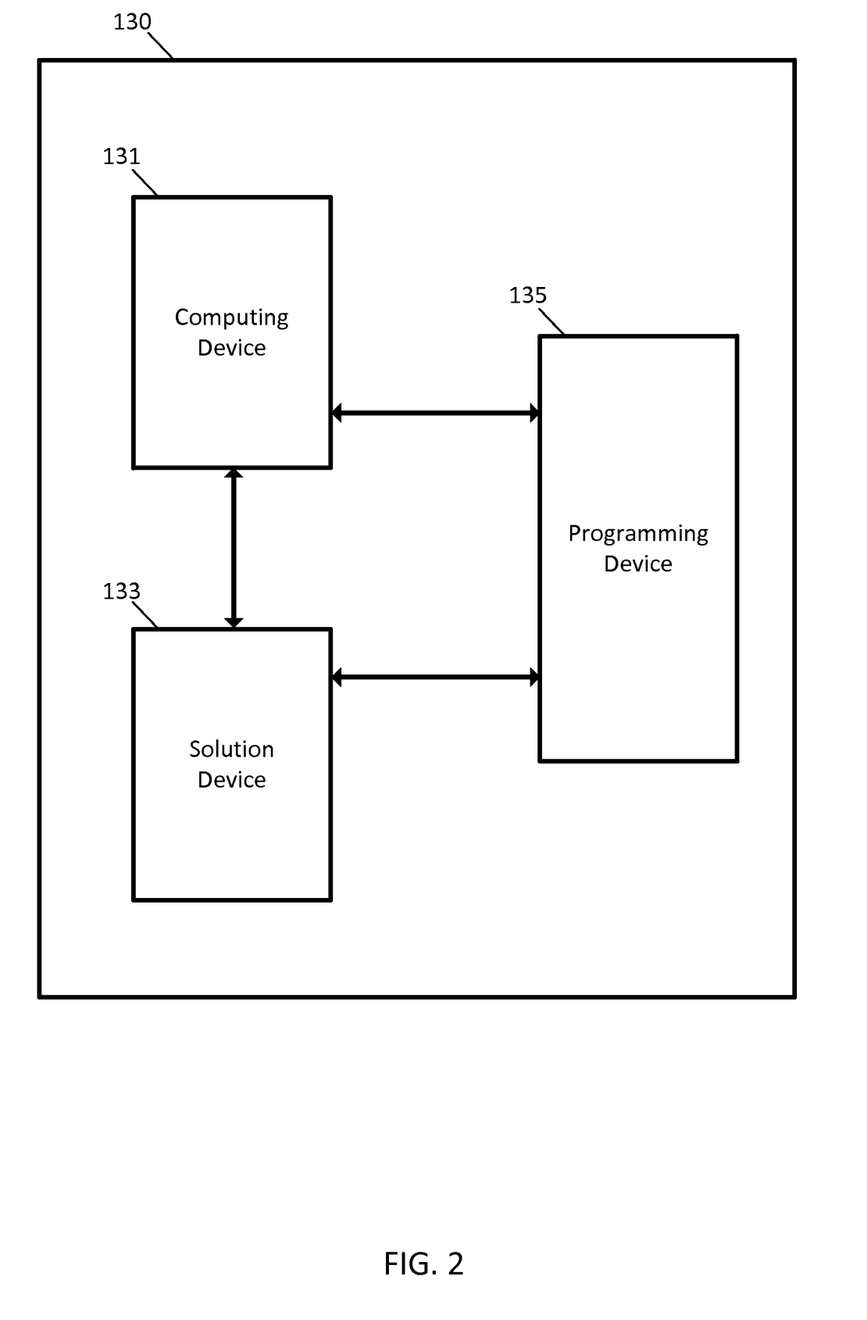
FIG. 2 illustrates another system for optimizing privileges and assigning new privileges.

FIG. 2 illustrates another system 130 for optimizing privileges and assigning new privileges. The system includes a computing device 131, a solution device 133, and a programming device 135. Additional, different, or fewer components may be included. The computing device 131 may implement an embedded system. The solution device 133 analyzes programs on the computing device 131, and the programming device 135 assigns new privileges to the programs on the computing device 131.

The computing device 131 is configured to perform a set of processes associated with a root privilege level. In one example, all of the processes for at least one program executed by the computing device 131 are assigned the root privilege level. An interposer library is installed on the computing device 131 to generate an access map based on relationships of the processes executed by the computing device 131.

When a program that uses dynamic libraries is compiled, any called function which is implemented outside of the program is inserted into the executable file that includes the program as an unresolved symbol. An unresolved symbol is a symbol that has been declared or used but not adequately defined. A table (e.g., the procedure linkage table (PLT)) may be created to contain unresolved symbols in the program. Additionally, a list of libraries to which the program is linked may also be included.

At runtime or upon execution of the program, when one of the functions represented by an unresolved symbol is called, the process checks the PLT for the address of the code for that symbol. The first time the symbol is called and the address is not set, a dynamic linker utility is invoked. The linker utility searches through the linked libraries of the program for the symbol. If the symbol is found, the linker utility inserts the address of the needed code back into the PLT so the next invocation of that symbol does not require the involvement of the linker utility. The linker utility searches the libraries of the program in order, checking each for the requested symbol until a match is found. Multiple libraries may contain an implementation of the symbol, but only the first library is found and used by the linker utility.

The linker utility may also allow a user to specify a library (or libraries) to be inserted as the first in the chain to be searched by any or all processes. This is called preloading. By preloading a library containing function X, for example, all calls to function X invoke the version found in the preloaded library rather than the standard version found in the standard library (e.g., libc).

The computing device 131 may create an additional implementation of any function the user specifies in the interposer library. By then preloading the library, all calls to those functions invoke the implementation of the interposer library rather than the expected one from the standard library. The interposed function does the work that is necessary to record information about the function call, and instructs the linker utility to find the second version of the function, which is then invoked to complete the original request as expected. The library transparently gathers information about the computing device 131, which may be used by another tool to create an access map or least privilege security model.

In one example, a static scanner utility is installed in the computing device 131. The static scanner utility is configured to scan a compiled program to identify function calls to functions supported by the interposer library. The identified functions called may be compared to the results from the interposer library in order to check the coverage of the runtime logs. For example, the results from the interposer library may be compared to the information recorded by the static scanner to ensure that all calls found in the file on disk were also seen by the interposer library during the testing. The static scanner allows a user to ensure testing covers all relevant code, but the static scanner may be omitted if the user does not opt for such coverage.

The static scanner utility may identify a subset of the function calls. The subset may be function calls that should be intercepted by the interposer library. The static scanner utility may use various utilities. In one example, for a POSIX system, the file utility and/or the objdump utility may be used. The file utility is configured to determine the architecture of a specific program. The objdump utility is configured to access the assembly code of a program. The static scanner utility is configured to determine the processor architecture of the system and then search for instructions in the assembly code that are used for function calls on the architecture and call into the procedure linkage table (PLT). The static scanner utility is configured to identify the symbols for linked calls as used by the linker utility. Thus, the static scanner utility is configured to identify the subset of function calls based on the symbols.

After completing the scan through the assembly code, the static scanner utility is configured to output a list of the identified calls. The calls are associated in a table with the address from which the call will be made. The address can be matched to the addresses from the interposer library to check the coverage of the results of the interposer library.

The solution device 133 or solution generator is configured to analyze the access map or least privilege security model based on the relationships of the processes and calculate process specific privileges for the set of processes. The solution device 133 makes recommendation on how to convert the computing device 131 to the least privilege security model. In one example, the solution device 133 assigns a user identifier (uid) to each process and a set of groups that each user identifier should belong to. The solution device 133 may generate a table with the user identifiers of the owners and groups to be assigned to each process. The solution device 133 assigns each process a different user identifier, each file a different group, and adds user identifiers to groups as necessary for the processes to have access to the files that the processes require to function as originally intended.

The solution device 133 may also identify any process that requires access to another process. An example of a process that requires access to another process includes a process that sends a kill signal to another process. When one process requires access to another process, the two processes may be referred to as "related processes" or "linked processes." The solution device 133 may associate linked processes with the same user identifier. In order to implement this rule, no process can be associated with the root user or superuser.

Depending on the operating system of the computing device 131, a user may be limited to a maximum number of groups. Examples for the maximum number of groups include 8, 16, and 32. A standard Linux system may permit each user to belong to a maximum of 16 groups. For any process which needs access to the maximum number of groups or fewer, this limitation does not pose any problems. However, if a process requires access to more than the maximum number of groups, the solution device 133 is configured to combine groups to allow the process full access. The maximum number of groups may be set to a default value and/or configurable at runtime through a command line flag.

In one example, the solution device 133 combines groups by searching through the groups and performing the combination of least impact. The solution device 133 is configured to calculate an impact score for each combination of groups. The impact score of a combination is defined by Equation 1.

$$([\text{num procs in grp1 but not grp2}]*[\text{num files in grp2}])+$$

$$([\text{num procs in grp2 but not grp1}]*[\text{num files in grp1}]) \qquad \text{Eq. 1}$$

Equation 1 is deigned to combine two groups while increasing the "unnecessary access," which occurs inherently when groups are combined, by as little as possible. When two groups are combined, the processes that were in group 1 but not group 2 will now have access to the files owned by group 2 even though they do not need that access, and vice versa for processes in group 2 but not group 1. Equation 1 counts each file that will be made available to a process that does not need it as one "unnecessary access," adds up the number of such accesses that will be allowed by a given group combination, and then the solution generator combines the two groups with the fewest number of unnecessary accesses to minimize the impact. Other scoring approaches may be used. The solution device 133 is configured to combine groups as necessary until every process has full access to the files required by the process while belonging to the minimum, or at most, the maximum, number of groups.

The solution generator may also perform a coverage check based on any static scan results provided. It does this by starting with the list of static scan results and removing any call caught by the interposer. The comparison of calls is based on the name of the executable and address of the call. After all of the calls caught by the interposer are removed, the remaining list is what was not caught at runtime and is printed to the results. The solution generator may then expand the testing to catch these calls.

The programming device 135 may configure the embedded system of the computing device 131 with the process specific privileges. In one example, a user (e.g., engineer or programmer) reads the set of procedures from the least privilege solution or directly from the access map. The user may execute utilities (e.g., Linux tools) to reassign privileges to one or more processes, delete process and replace with a different number of privileges. In another example, the server 101 or the computing device 131 may execute a privilege reassignment tool that assigns privileges to the processes without user input and/or without user initiation.

The solution generator may also include an analyzer module. The analyzer module is configured to interact with and modify the generated solution in a limited way. The limits of the analyzer module ensure that the solution has the least privilege setup, while also allowing a user to modify the solution to solve any errors that may arise or simply to make the solution easier to apply. The modified solution may be saved as a text file for future reference.

Figure 3A:
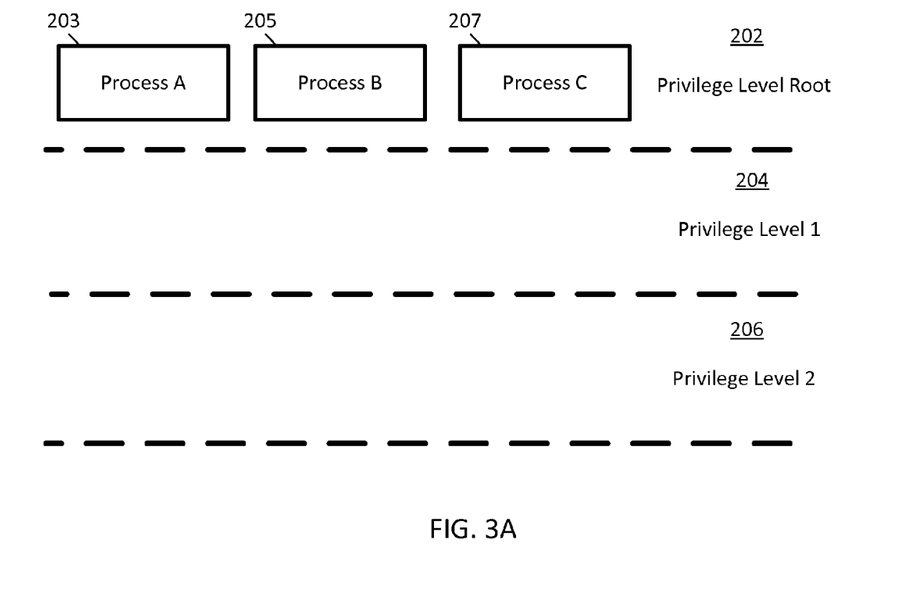
FIGS. 3A and 3B illustrate a hierarchy of privileges in the systems of FIGS. 1 and 2 before and after new privileges are assigned.
Figure 3B:
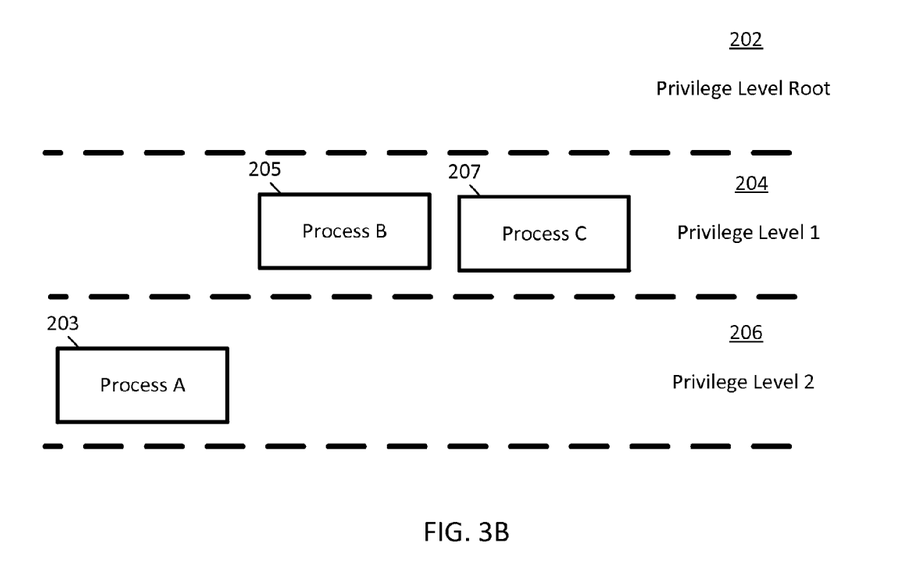

FIGS. 3A and 3B illustrate a hierarchy of privileges in the systems of FIGS. 1 and 2 before and after new privileges are assigned. Any number of privilege levels may be included. FIG. 3A illustrates an initial state in which process 203, process 205, and process 207 are assigned a privilege level of root 202. The initial state of the server 101 or the computing device 131 is before privilege separation has been applied. Thus, all processes are assigned to the privilege level root 202. In another example, some of the processes may be assigned to other privilege levels, but at least one process in the initial state is assigned to the privilege level root 202. In other examples, none of the processes are assigned to the privilege level root 202.

FIG. 3B illustrates a final state in which process 203 is assigned privilege level 2 206, process 205 is assigned privilege level 1 204, process 207 is assigned privilege level 1 204, and no processes are assigned to privilege level root 202.

The privileges may define access to certain resources. A privilege may give rights to read certain files, execute certain files, and/or write certain files. Alternatively, rights may be assigned to types of files. The files may be classified to multiple classification levels. A reading privilege may be assigned to each classification level, and a writing privilege may be assigned to each classification level. Combinations of reading access and writing access may be assigned to a privilege. For example, privilege level 1 may have access to write a first classification level of files and access to read the first classification level of files and a second classification level of files.

A privilege level may be associated with read or write access for shared memory. Additional classification levels for memory may be used. A privilege level may be associated with a semaphore. The semaphore is a mechanism to lock resources so that only a limited number (e.g., 1, 2, 3, or another number) of processes can access the resource at a time. The privilege level may allow a process to create, delete, or modify semaphores. The privilege level may provide permission for a process to access other processes. The processes may also be classified into levels, and the privilege level may give a process permission to access a specific level of processes.

Figure 4:
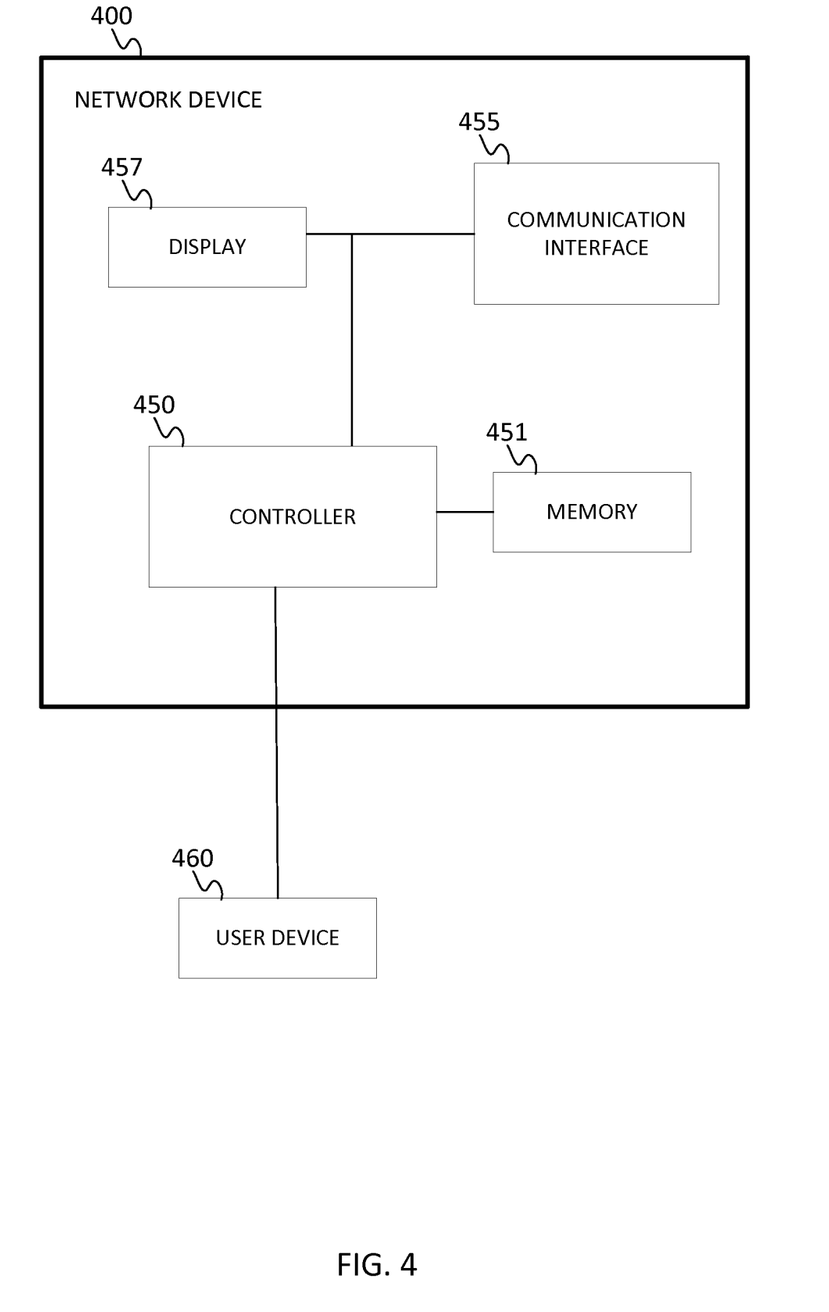
FIG. 4 illustrates an example network device.

FIG. 4 illustrates a network device 400. The network device 400 may be the server 101, the solution device 103, the computing device 131, the solution device 133, or the programming device 135. The network device 400 includes a controller 450, a memory 451, a communication interface 455, and optionally, a display 457. The network device 400 may also be in communication with a user device 460. Additional, different, or fewer components may be included. The following example describes the operation of the network device 400 as the server 101 or the computing device 131 for optimizing privileges in a server or an embedded system.

The memory 451 may store instructions for an embedded system and an interposer library for the embedded system. The embedded system may perform a specific task such as serve web data, host web services, or forward data packets.

The controller 450, which may be any type of processor, is configured to execute processes of the embedded system. In addition, the controller 450 may execute an algorithm for privilege separation. The specialized application of the embedded system on the network device 400 may initially be configured using a single privilege level. The algorithm for privilege separation identifies an optimal privilege level for the processes of the specialized application to replace the single privilege level configuration.

The controller 450 is configured to generate an access map based on relationships of the processes executed by the embedded system. The access map may be generated by iteratively examining all of the processes on the embedded system. The controller 450 may access the source code of the embedded system to identify all of the processes and the resources associated with each of the processes. The resources may include the memory 451, the communication interface 455, other interfaces, processes, file access, or anything that can be called by a function in the processes.

In one example, the controller 450 performs a regression test on all processes of the embedded system to explore the relationships of the processes.

The controller 450 or another device analyzes the access map and the relationships between processes and resources to determine what privileges levels are needed for each process. The controller 450 may identify the minimum requisite privilege level for each process. The array of the minimum requisite privilege levels across all of the processes is a least privilege solution. The least privilege solution may be defined by a set of procedures. The set of procedures may describe individual changes in privilege level. One example procedure is remove root privilege from process X. Another example procedure is assign privilege level 2 to process X.

In another example, the communication interface 455 may be configured to send the access map to an external device. The external device may identify the minimum requisite privilege level for each process for the least privilege solution. The external device may construct the set of procedures. The communication interface 455 may receive the set of procedures from the external device.

Figure 5:
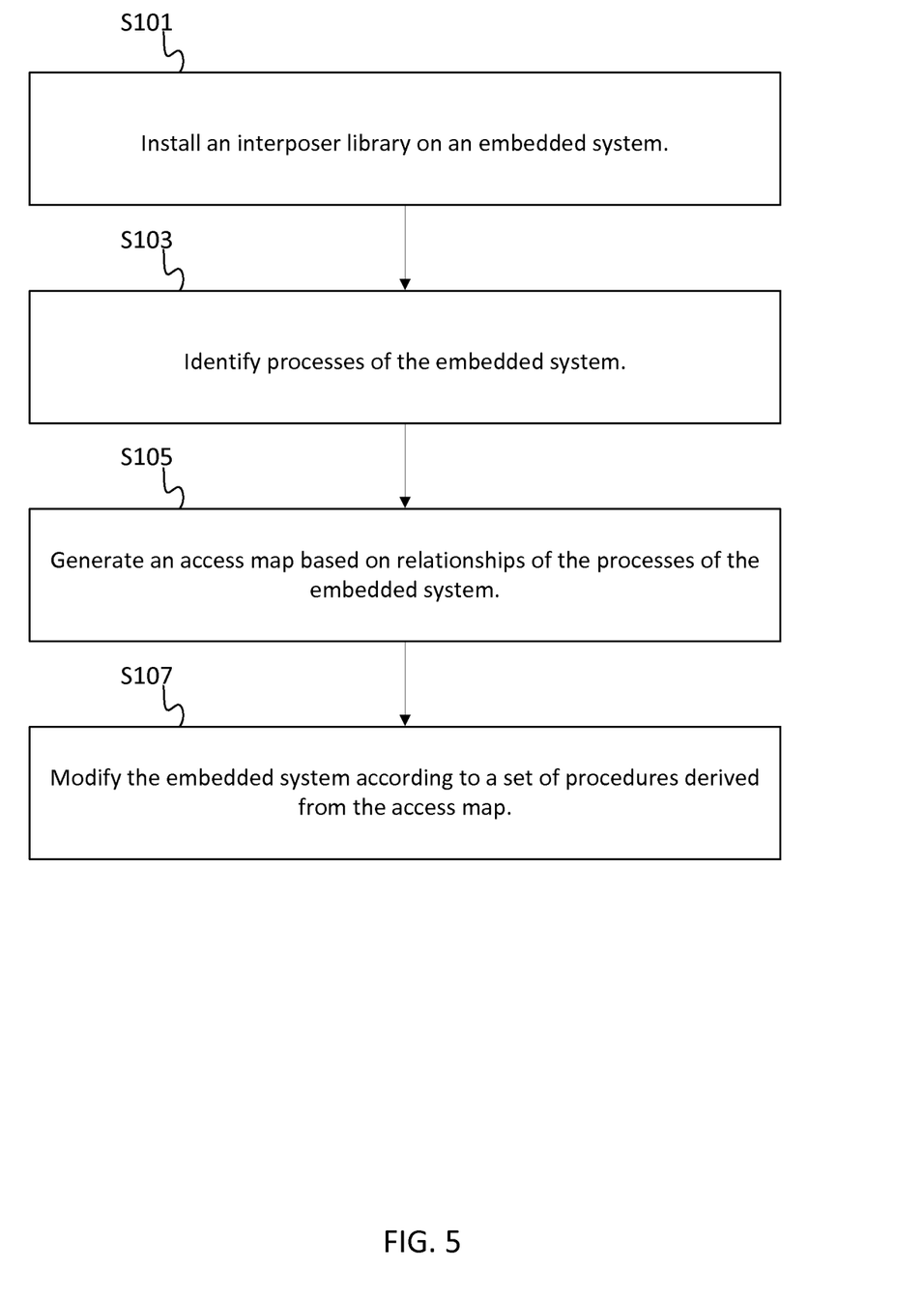
FIG. 5 illustrates an example flowchart for optimizing privileges in a server or an embedded system.

FIG. 5 illustrates an example flowchart for operation of the network device 400 as the server 101 or the computing device 131 for optimizing privileges in an embedded system such as a web server. Additional, fewer, or different acts may be included.

At act S101, an interposer library is installed on the embedded system. The interposer library intercepts processes of the embedded system as the processes are executed. In one example, the embedded system is operated under normal operating conditions. As processes are used, the interposer library identifies the processes, as shown by act S103, as well as the functions called by the processes. Alternatively, the user may locate the code that was not covered and execute the code while the interposer library is configured to record.

At act S105, an access map is generated that describes relationships of the processes. The access map describes the resources required by each process based on the functions called. The access map may be a table that associates processes with sets of requisite resources. The access map may include a hierarchy of processes that describes processes that access other processes. A least privilege solution may be derived from the access map that identifies the minimum privilege necessary for each process to have access to needed resources and not other resources.

The access map may also include information about other potential least privilege issues. For example, UNIX System V includes interprocess communication constructs (e.g., message queues or semaphores) that may encounter permissions related issues. Further, some functions require administrator level privileges to work correctly. These types of functions may be added to the access map along with information about the function that may be useful to a developer, including resources accessed, or location of the call in the code. This output provides a list of functions for a developer to manually inspect and ensure no permissions-related issues will arise.

At act S107, the processes of the embedded system are modified according to the access map. The modifications may include assigning or reassigning privileges to the processes and removing root or superuser privileges from all or most of the processes.

Figure 6:
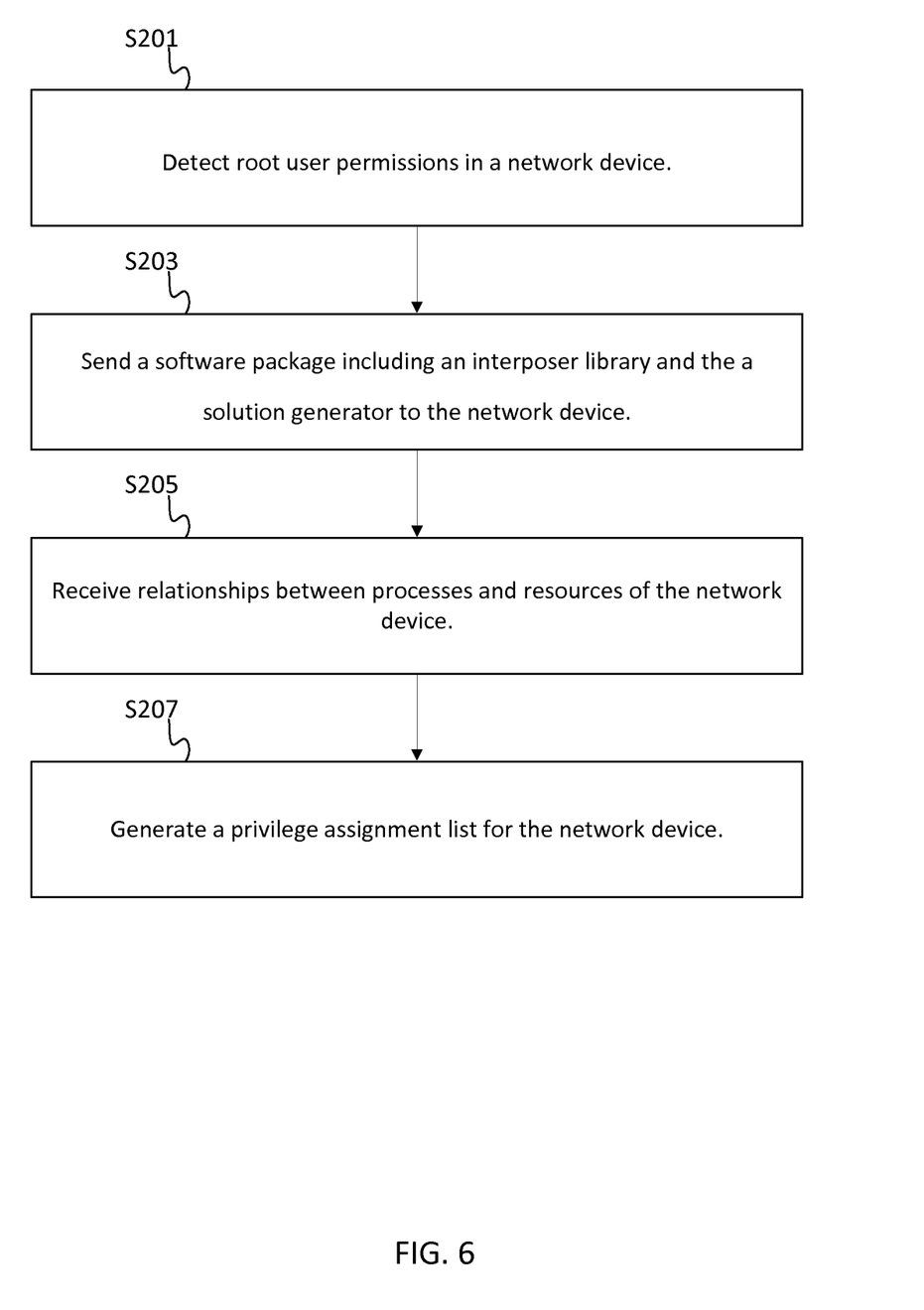
FIG. 6 illustrates another example flowchart for optimizing privileges in a server.

FIG. 6 illustrates another example flowchart for optimizing privileges in a server. Additional, fewer, or different acts may be included. The acts of FIG. 6 may be performed by a diagnostic device in communication locally or remotely to the network device 400. The diagnostic device may be a cloud service or a local product.

At act S201, the diagnostic device identifies that the network device 400 is not using optimized privilege settings. The diagnostic device may probe the network device 400 to detect the use of the root user. For example, the network device 400 may access the file system remotely through public or private login to detect whether only the root user is listed or whether multiple privileges are already being used. As another example, acts S203-207 are performed and any reassignment indicates a lack of optimization. In other embodiments, act S201 is not performed and the other acts are initiated in response to a request for optimization.

At act S203, the diagnostic device sends a software package including the interposer library and the solution generator to the network device 400. The interposer library is installed to intercept processes of the network device 400 while the processes are run under normal conditions. The network device 400 may be run for a predetermined amount of time (e.g., 1 day, 1 week, 1 month, or another time period).

At act S205, the diagnostic device receives relationships between processes and resources of the network device. The relationships may be derived by the solution generator installed from the software package based on the data gathered by the interposer library. The relationships may be delivered in a table format that describes each process and the resources required by the process.

At act S207, the diagnostic device analyzes the relationships to generate a privilege assignment list for the network device 400. The privilege assignment may describe existing privileges levels of the network device and reassign processes to the existing privilege levels. The privilege assignment may define new privileges. The new privileges may be defined according to access levels to memory, files, process, and other resources. The privilege assignment may be a matrix that pairs each process to every resource in the network device 400. At each position of the matrix, a first flag level indicates that process should have access and a second flag level indicates that the process should not have access. Each unique combination of flags in a row of the matrix defines a privilege.

The privileges of the network device 400 are converted to the privileges developed in the list. In one embodiment, the previous assignment of privileges may be stored or backed up. The network device 400 or the diagnostic device stores the backup and is configured to install the backup back into the network device 400 if an error is detected in conversion to the new privilege list. The process may be repeated for a new assignment of privileges. In addition, the network device 400 may be converted to least privilege in stages. Since a typical system is very large and complicated, conversion of the system all at once may introduce errors. Instead, smaller groups of processes may be analyzed for a least privilege solution at a time.

The controller 450 may include a general processor, digital signal processor, an application specific integrated circuit (ASIC), field programmable gate array (FPGA), analog circuit, digital circuit, combinations thereof, or other now known or later developed processor. The controller 450 may be a single device or combinations of devices, such as associated with a network, distributed processing, or cloud computing.

The memory 451 may be a volatile memory or a non-volatile memory. The memory 451 may include one or more of a read only memory (ROM), random access memory (RAM), a flash memory, an electronic erasable program read only memory (EEPROM), or other type of memory. The memory 451 may be removable from the network device 400, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium (e.g., memory 451), the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
installing an interposer library on a system;
executing, using a processor, processes of the system, wherein the interposer library intercepts data indicative of relationships of the processes;
generating an access map based on the relationships of the processes of the system;
storing the access map; and
modifying privileges of the processes of the system according to a set of procedures derived from the access map, wherein the set of procedures define a least privilege solution for the processes of the system that assign privileges at a lowest level possible for the processes and maintain the relationships of the processes.

2. The method of claim 1, further comprising:
sending the access map to an external device; and
receiving the set of procedures from the external device.

3. The method of claim 1, further comprising:
executing code of the processes of the system to explore the relationships of the processes.

4. The method of claim 1, further comprising:
generating at least one group of processes assigned to a same privilege level based on the set of procedures.

5. The method of claim 1, wherein the set of procedures specifies removing root access for at least one process or at least one user.

6. The method of claim 1, further comprising:
selecting processes of the system through a predetermined sequence.

7. The method of claim 1, wherein the access map describes calls performed by the processes and the set of procedures describes the minimum privilege level to perform the processes.

8. The method of claim 1, further comprising:
identifying at least one function call for each of the processes;
identifying resources to satisfy the at least one function call; and
determining a privilege level for each of the processes based on the resources.

9. An apparatus comprising:
a memory storing instructions for a system and an interposer library for the system, wherein the interposer library is first in a chain of libraries for the system; and
a hardware processor configured to execute processes of the system and generate an access map based on relationships of the processes intercepted by the interposer library and executed by the system, wherein privileges of the processes of the system are modified according to a set of procedures derived from the access map,
wherein the set of procedures define a least privilege solution for the processes of the system that assign privileges at a lowest level possible for the processes and maintain the relationships of the processes.

10. The apparatus of claim 9, wherein at least one of the privileges is a root user that is removed from at least one of the processes according to the set of procedures.

11. The apparatus of claim 9, further comprising:
a communication interface configured to send the access map to an external device and receive the set of procedures from the external device.

12. The apparatus of claim 9, wherein the processor is configured to perform a regression test on the processes of the system to explore the relationships of the processes.

13. The apparatus of claim 9, wherein the set of procedures specify removing root access for at least one process.

14. The apparatus of claim 9, wherein relationships include the requisite file access, memory access, and other process access for each of the processes of the system.

15. The apparatus of claim 9, wherein the access map describes calls performed by the processes and the set of procedures describes the minimum privilege level to perform the processes.

16. A system comprising:
a computing device configured to perform a set of processes associated with a root privilege level, wherein an interposer library is installed on the computing device to generate an access map based on relationships of the processes executed by the computing device, wherein the interposer library is first in a chain of libraries for the computing device;
a solution device configured to analyze the access map based on the relationships of the processes and calculate process specific privileges for the set of processes; and
a programming device configured to configure the system with the process specific privileges,
wherein the specific privileges for the set of procedures define a least privilege solution for the processes of the system that assign privileges at a lowest level possible for the processes and maintain the relationships of the processes.

17. The system of claim 16, wherein at least one of the process specific privileges is a root user that is removed from at least one of the processes according to the access map.

* * * * *